July 15, 1947.   R. F. E. STEGEMAN   2,424,064
ILLUMINATING DEVICE
Filed July 13, 1944
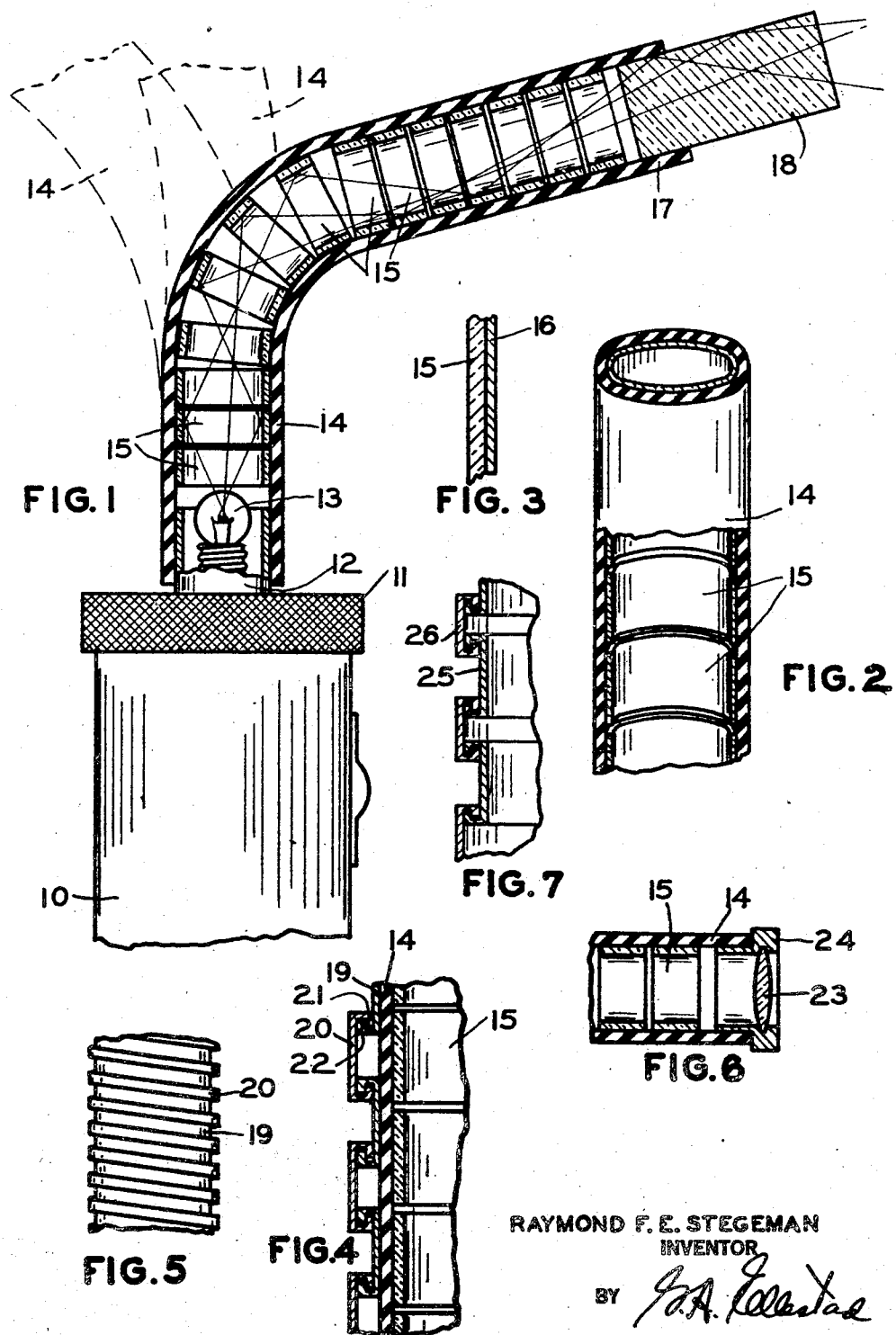
RAYMOND F. E. STEGEMAN
INVENTOR
BY *J. A. Ellestad*
ATTORNEY Patented July 15, 1947

2,424,064

UNITED STATES PATENT OFFICE 2,424,064

ILLUMINATING DEVICE

Raymond F. E. Stegeman, Greece, N. Y., assignor to Bausch & Lomb Optical Company, Rochester, N. Y., a corporation of New York Application July 13, 1944, Serial No. 544,756

5 Claims. (Cl. 240—2.18)

This invention relates to an illuminating device and more particularly it has reference to means whereby light rays, emanating from a source, may be directed through a flexed tube.

The primary object of this invention is to provide means of the type described whereby light rays from a source may be confined and directed into selectively adjusted position with respect to the source. A further object is to provide means whereby light rays from a source may be directed through a flexed tube. Other objects are to provide a device of the type described which can be readily and cheaply manufactured and which will be convenient and efficient in use. Other objects and advantages reside in certain novel features of construction, arrangement, and combination of parts which will hereinafter be more fully described and pointed out in the appended claims.

In referring to the drawings:

Fig. 1 shows an illuminating device, with parts in section, embodying my invention.

Fig. 2 is a fragmentary enlarged view, with parts broken away, showing the construction of the flexible tube and the reflecting elements.

Fig. 3 is a sectional view on an enlarged scale showing the reflecting surface of the element.

Fig. 4 is a fragmentary sectional view showing a modification.

Fig. 5 is a fragmentary elevational view of same.

Fig. 6 is a fragmentary sectional view of another modification.

Fig. 7 is a fragmentary sectional view of still another modification.

In a preferred embodiment of my invention, shown in Fig. 1, 10 indicates a casing carrying a battery (not shown) for supplying electric current to an incandescent lamp 13 carried within a sleeve 12 mounted on cap 11 secured to casing 10. A flexible tubular member 14, which is preferably opaque and formed of any suitable material such as rubber, is slipped snugly over the sleeve 12 so as to be securely held thereby. Mounted within the tube 14 are the glass reflecting elements 15 which are formed as short cylindrical tubes carrying the silvered reflecting surfaces 16. These reflecting elements are positioned in substantially end-to-end relationship and extend from a point adjacent the light source 13 to the other end 17 of the tube 14. Since the elements are separate, it will be apparent that, as the tube 14 is flexed, the elements adjacent the point of flexure will be separated from each other as illustrated clearly in Fig. 1. The end 17 of the tube 14 may be closed by a block or rod of material 18 such as glass or a transparent plastic.

In operation of my device, light rays from the source 13 will strike the adjacent elements 15 and thence be successively reflected by other elements 15 until a portion of the light rays emerges through the transparent rod 18 at the end of tube 14. When the tube 14 is flexed into a position shown in Fig. 1, some of the light rays will take the paths indicated on the drawing.

In some instances, it may be desirable to provide means for holding the flexible tube 14 in adjusted position. One method of accomplishing this is to provide an outer casing for the tube 14 such as a well known type of flexible metal conduit comprising a metal strip which is helically wound around the tube 14. The inturned edge 21 of another helical strip 20 engages a similar cooperating edge 22 on strip 19 so that the members 19 and 20 may be selectively flexed and the friction between the metallic members 19 and 20 is sufficient to hold the tube 14 in adjusted position. As shown in Fig. 6, a condensing lens element 23 may be held in a bushing 24 inserted in the end of tube 14 instead of the rod 18. In Fig. 7 I have shown a further modification in which the flexible tube comprises the two helically wound elements 25 and 26 with the inner surface of the elements 25 serving as a reflecting face to reflect light rays from the fixed source.

From the foregoing it will be apparent that I am able to attain the objects of my invention and provide an illuminating device having a light source and flexible means for confining and directing light rays from said source into selected position with respect to the source. It is obvious, of course, that any suitable materials may be used in the construction of the various forms of my device. Thus, for example, the flexible tube 14 may be of plastic material, artificial rubber, or the like and the reflecting elements 15 may be formed of silvered or aluminized glass cylinders or they may be made of metal tubing having an inner polished face. It has previously been proposed to transmit light rays from a source through a curved cylindrical rod made of glass or other light transmitting material. With such devices, a great deal of light is absorbed while passing through the solid material of the rod and then, of course, the rod is not flexible. With my invention, however, the light rays are reflected through air so that the absorption is not as great and my construction also permits the tube to be flexed in any desired direction with respect to the source. Various other modifications can obviously be made without departing from the spirit of my invention.

I claim:

1. An illuminating device comprising a flexible tube, light reflecting means positioned within the bore of the tube, said means being substantially coextensive with the bore of the tube, said means comprising a plurality of spaced tubular reflecting elements arranged in end-to-end relation within the bore of the tube, a light source positioned at one end of the tube for directing light rays onto the inner faces of said elements, the light rays being successively reflected by said elements when the tube is flexed whereby light rays will emerge from the other end of the flexed tube.

2. An illuminating device comprising a flexible tube, a plurality of cylindrical tubular elements positioned within the bore of the tube in end-to-end relation with the axes thereof substantially coincident with the axis of the tube, the walls of said elements serving as reflecting means, and means for projecting light rays onto the inner walls of said elements at one end of the tube whereby the light rays will be successively reflected by the elements and emerge at the other end of the tube when the tube is flexed.

3. An illuminating device comprising a flexible tube, a plurality of tubular elements positioned within the bore of the tube in end-to-end relation with the axes thereof substantially coincident with the axis of the tube, the walls of said elements serving as reflecting means, means for projecting light rays onto said elements at one end of the tube whereby the light rays will be successively reflected by the elements and emerge at the other end of the tube when the tube is flexed, and means for holding said tube in selected, flexed position.

4. An illuminating device comprising a flexible tube, light reflecting means substantially coextensive with and positioned within the bore of the tube, said means comprising a plurality of tubular elements arranged in end-to-end relation, said means being located on opposite sides of the axis of the tube and a light source positioned at one end of the tube for directing light rays onto said means whereby light rays will be reflected successively by the means in paths diagonal to the axis of the tube and emerge from the other end of the tube when the tube is flexed in a plane which is substantially perpendicular to the reflecting surfaces of the means, and means for selectively holding the tube in flexed position, said last named means comprising helically wound members substantially surrounding that portion of the tube which is to be flexed, the edge portions of the helically wound members being in frictional engagement with each other.

5. An illuminating device comprising a casing carrying a light source, a collar surrounding the source and carried by the casing, a flexible tube having one end secured over the collar, a plurality of tubular, cylindrical elements positioned in the tube in end-to-end relation and extending substantially throughout the length of the tube, the inner walls of the elements being adapted to reflect light rays, the end-to-end spacing of the elements permitting flexing of the tube, light rays from the source being successively reflected by the elements and directed out through the other end of the tube as the latter is flexed whereby light rays from the source may be selectively directed by flexing the tube.

RAYMOND F. E. STEGEMAN.

REFERENCES CITED

The following references are of record in the file of this patent:

UNITED STATES PATENTS

| Number | Name | Date |
| --- | --- | --- |
| 247,229 | Wheeler | Sept. 20, 1881 |
| 1,751,584 | Hansell | Mar. 25, 1930 |
| 218,055 | Nitze | July 29, 1879 |
| 1,550,197 | Berry | Aug. 18, 1925 |
| 1,782,906 | Newman | Nov. 25, 1930 |
| 1,915,811 | Wolf | June 27, 1933 |
| 917,021 | De Zeng | Apr. 6, 1909 |

FOREIGN PATENTS

| Number | Country | Date |
| --- | --- | --- |
| 787,117 | France | 1935 |